July 3, 1962 C. E. BERGMAN 3,042,871
PULSE PHASE COMPARISON SYSTEM
Filed April 22, 1960
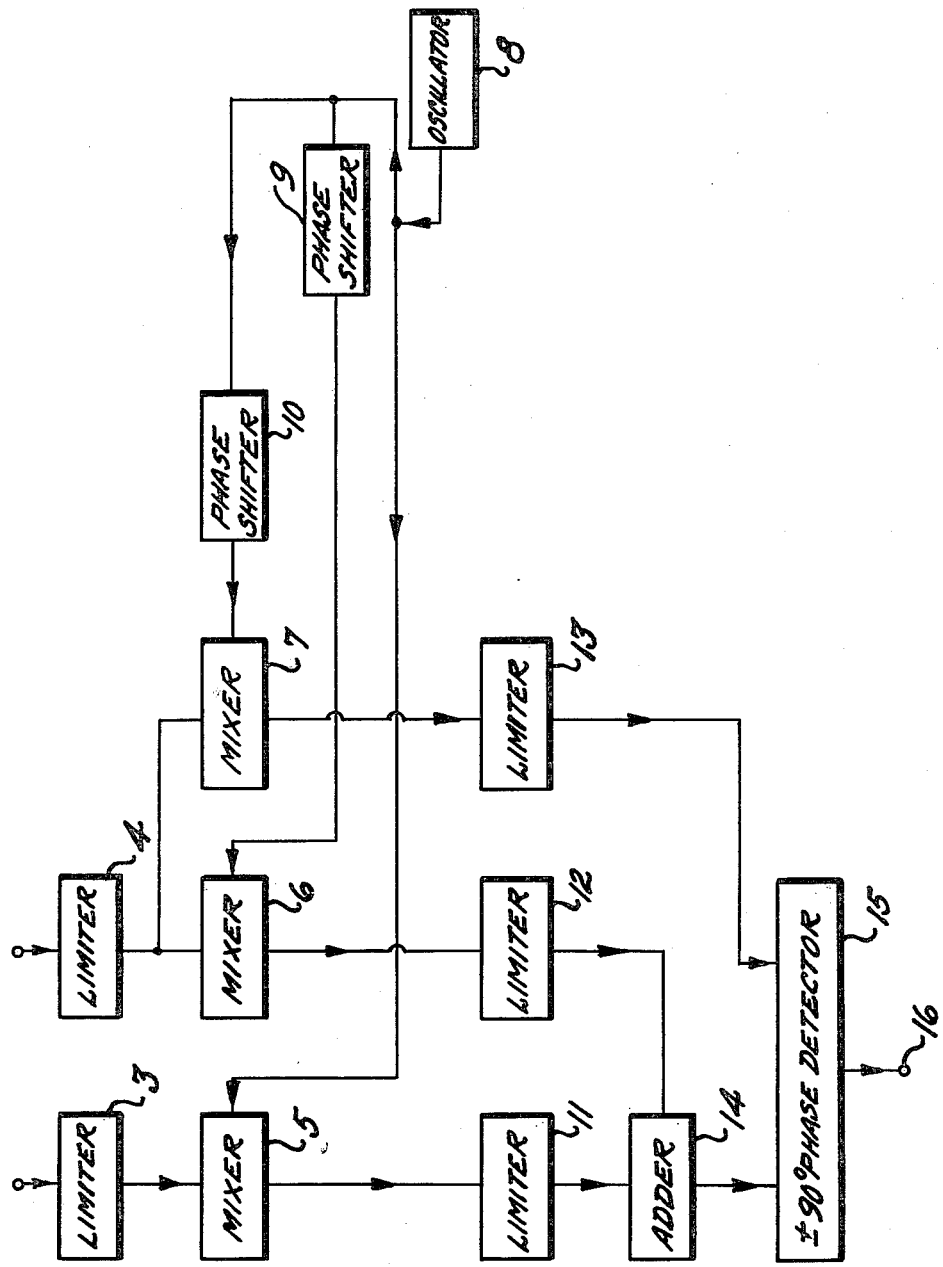
INVENTOR.
CLARENCE E. BERGMAN
BY
ATTORNEYS

United States Patent Office 3,042,871
Patented July 3, 1962

3,042,871
PULSE PHASE COMPARISON SYSTEM
Clarence E. Bergman, Fairfax County, Va., assignor to the United States of America as represented by the Secretary of the Air Force
Filed Apr. 22, 1960, Ser. No. 24,180
3 Claims. (Cl. 328—133)

This invention relates to a system for phase comparing one signal against another and more particularly to a system including a tuned channel for each of aforesaid signals.

In many electronic systems, it is a requisite to compare one signal against the other in phase. In many instances, it is desirable to measure the magnitude of phase shift in a circuit or system and this is accomplished by comparing the phase of the input signal to that of the output signal. Another utilization of a phase comparison system is in a radar such as the moving-target-indication system which utilizes the Doppler effect to eliminate permanent echoes while preserving echoes from a moving target. The phase of the echo signal existing in the intermediate-frequency amplifier system of the radar receiver is compared with the phase of a reference oscillator so operated that its phase is related in a definite way to the phase of a transmitted pulse. Therefore, a phase comparison is necessary.

There are limitations in phase comparison systems as stray phase shifts are introduced within the aforementioned systems. Previously, in order to compensate for stray phase shifts the phase comparison systems including tuned circuits such as in an intermediate-frequency amplifier, are detuned. The detuning in the tuned circuits produces quadrature effects due to the nonsymmetry of the pass bands. As a result, it is all but impossible to correct for the aforementioned stray phase shifts and still maintain output pulse signals from the phase comparison system free of quadrature effects.

In my copending application entitled Pulse Phase Comparison System, filed at an even date herewith, is disclosed a phase comparison system eliminating quadrature effects. The present invention is an improvement thereof and extends the useful operating range of the phase comparison system while simultaneously eliminating the quadrature effects of the output pulse signals therefrom.

An object of the present invention is to provide a novel system wherein compensation is introduced for stray phase shifts existing in the aforesaid system.

Another object of the present invention is to provide a novel phase comparison system wherein one pulse signal is phase compared to another over a range of ±180° and wherein compensation is provided for any stray phase shifts introduced by the aforesaid system over the range of ±180°.

The features of this invention which are believed to be new are set forth with particularity in the appended claims. The invention itself, however, together with further objects and advantages thereof may best be understood by reference to the following description when taken in conjunction with the accompanying drawing.

In the single FIGURE of the drawing, limiters 3 and 4 receive first and second intermediate-frequency pulse signals by way of input terminals 1 and 2 respectively. Mixer 5 receives simultaneously a continuous wave signal from oscillator 8 and a pulse signal from limiter 3. Mixer 6 receives simultaneously a continuous wave signal from oscillator 8 by way of phase shifter 9 and a pulse signal from limiter 4. Mixer 7 receives simultaneously a continuous wave signal from oscillator 8 by way of phase shifter 10 and a pulse signal from limiter 4.

Mixer 5 heterodynes the limited first pulse signal to a new intermediate frequency which is fed to adder 14 by way of limiter 11. Mixer 6 heterodynes the limited second pulse signal to a new intermediate frequency which is then fed to adder 14 by way of limiter 12. Mixer 7 heterodynes the limited second signal to a new intermediate frequency which is fed to simple ±90° phase detector 15 by way of limiter 13. Phase detector 15 also receives the resultant signal from adder 14. The output pulse signal is derived from terminal 16.

In the operation of the system, it is to be noted that two signals are applied to adder 14, one signal being from limiter 11, hereinafter referred to as A, and another signal from limiter 12, hereinafter referred to as B. The signal from limiter 13 may also be referred to as signal B as it is derived from a common source. Signals A and B are summed by adder 14, and the sum, together with B is fed into $+90°$ phase detector 15. As the angle between $A+B$ and B is one-half the angle between A and B, the overall phase detector then has a maximum range of ± 180°.

In my copending patent application, entitled "Pulse Phase Comparison System," filed at even date herewith, it was disclosed that stray phase shift between two I.F. channels were corrected for by detuning the tuned circuit in the system and as a result thereof, quadrature effects were introduced in the output pulse signal. The novel phase comparison system as described in detail herein eliminates this alignment problem through the use of phase shifters in the C.W. circuitry. Any phase shift in the C.W. circuitry, through the mixing action, is introduced into the signal channels. Thus, any phase shift up to adder 14 is corrected for by the C.W. phase shifters, with no loss of performance. The stray phase shift in the channels following adder 14 presents a more severe problem but is also corrected. In the operation of the system, phase shifter 9 is utilized to correct for stray phase shifts in the two channels up to adder 14. Phase shifter 10 and mixer 7 are utilized to compensate for phase shift following the adder, and for that in the channel including mixer 7 and limiter 13. The present invention thus provides a phase comparison system that provides complete compensation for any stray phase shifts introduced by aforesaid system and the compensation is effective over a range of ±180°.

While a particular embodiment of the invention has been shown and described, modifications may be made and it is intended in the appended claims to cover all such modifications as may fall within the true spirit and scope of the invention.

I claim:

1. A system to phase compare a first intermediate frequency pulse signal to a second intermediate frequency pulse signal comprising an input circuit for each of said pulse signals, each of said input circuits including a limiter, three mixer means, the first of said mixer means receiving the output signal from one of said limiters, the said second and third mixer means receiving the output signal from the other of said limiters, oscillator means generating a continuous wave signal applied directly to said first mixer means, first means to phase shift said generated continuous wave signal for application to said second mixer means, second means for phase shifting said generated continuous wave signal for application to said third mixer means, means to add the output signals from said first and second mixer, and means to phase compare the resultant signal from said adding operation to the output signal from said third mixer means.

2. A system for phase comparing a first intermediate frequency pulse signal to a second intermediate frequency pulse signal comprising an input circuit for each of said pulse signals, each of said input circuits including a limiter for each of said pulse signals, first means to heterodyne said first limited pulse signal to a preselected new frequency, second means to heterodyne said second limited pulse signal to said preselected frequency, said second means including a first phase shifter, third means to heterodyne said second limited pulse signal to said preselected frequency, said third means including a second phase shifter, means to add the output signals from said first and second heterodyning means, and means to phase compare the resultant signal from said adding operation to the output signal from said third heterodyning means.

3. A system to phase compare a first intermediate pulse signal to a second intermediate pulse signal comprising an input circuit for each of said pulse signals, each of said input circuits including a limiter, three mixers, the first of said mixers receiving the output signal from one of said limiters, the second and third of said mixers receiving the output signal from the other of said limiters, an oscillator generating a continuous wave signal, said generated continuous wave signal being received by said first mixer, first means to phase shift said generated continuous wave signal prior to application to said second mixer, second means to phase shift said generated continuous wave signal prior to application to said third mixer, means to add the output signal from said first mixer to the output signal of said second mixer, and means to phase compare the resultant signal from said adding operation to the output signal from said third mixer.

References Cited in the file of this patent

FOREIGN PATENTS 580,538 Great Britain _____ Sept. 11, 1946